US011907672B2

(12) United States Patent
Nugent et al.

(10) Patent No.: US 11,907,672 B2
(45) Date of Patent: Feb. 20, 2024

(54) MACHINE-LEARNING NATURAL LANGUAGE PROCESSING CLASSIFIER FOR CONTENT CLASSIFICATION

(71) Applicant: REFINITIV US ORGANIZATION LLC, New York, NY (US)

(72) Inventors: Tim Nugent, London (GB); Matt Harding, London (GB); Jochen Lothar Leidner, London (GB)

(73) Assignee: REFINITIV US ORGANIZATION LLC, New York, NY (US)

(*) Notice: Subject to any disclaimer, the term of this patent is extended or adjusted under 35 U.S.C. 154(b) by 541 days.

(21) Appl. No.: 16/893,146

(22) Filed: Jun. 4, 2020

(65) Prior Publication Data

US 2020/0387675 A1     Dec. 10, 2020

Related U.S. Application Data

(60) Provisional application No. 62/857,417, filed on Jun. 5, 2019.

(51) Int. Cl.
*G06F 40/40*     (2020.01)
*G06N 3/088*     (2023.01)
*G06N 3/045*     (2023.01)

(52) U.S. Cl.
CPC ............. *G06F 40/40* (2020.01); *G06N 3/045* (2023.01); *G06N 3/088* (2013.01)

(58) Field of Classification Search
CPC .......... G06F 40/40; G06F 16/35; G06F 40/30; G06N 3/0454; G06N 3/088
See application file for complete search history.

(56) References Cited

U.S. PATENT DOCUMENTS

| 11,093,560 B2 | 8/2021 | Lee et al. |
| 2004/0122656 A1* | 6/2004 | Abir ...................... G06N 5/022 704/4 |
| 2011/0137636 A1 | 6/2011 | Srihari et al. |
| 2016/0012818 A1 | 1/2016 | Faizakof et al. |

(Continued)

OTHER PUBLICATIONS

Dogu Araci. FinBERT: Financial sentiment analysis with pre-trained language models. arXiv preprint arXiv:1908.10063, 2019, 11 pages.

(Continued)

*Primary Examiner* — Michael N Opsasnick
(74) *Attorney, Agent, or Firm* — Pillsbury Winthrop Shaw Pittman, LLP

(57) ABSTRACT

Computer-readable media, systems and methods may improve classification of content based on a machine-learning natural language processing (ML-NLP) classifier. The system may train a general language model based on a general corpus, further train the general language model based on a domain-specific corpus to generate a domain-specific language model, and conduct supervised machine-learning based on the domain-specific language using topic-specific corpus labeled as relating to topics of interest to generate the ML-NLP classifier. Accordingly, the ML-NLP classifier may be trained on a general corpus, further trained on a domain-specific corpus, and fine-tuned on a topic-specific corpus. In this manner, domain-specific content may be classified into topics of interest. The ML-NLP classifier may classify content into the topics of interest.

20 Claims, 9 Drawing Sheets

(56) References Cited

U.S. PATENT DOCUMENTS

| | | | |
|---|---|---|---|
| 2016/0247061 A1* | 8/2016 | Trask | G06N 3/04 |
| 2017/0161372 A1 | 6/2017 | Fernandez et al. | |
| 2017/0286869 A1 | 10/2017 | Zarosim et al. | |
| 2017/0364587 A1 | 12/2017 | Krishnamurthy et al. | |
| 2018/0061408 A1 | 3/2018 | Andreas et al. | |
| 2018/0090128 A1* | 3/2018 | Kurata | G06F 40/20 |
| 2018/0314689 A1* | 11/2018 | Wang | G10L 15/1822 |
| 2018/0366013 A1 | 12/2018 | Arvindam | |
| 2019/0129942 A1 | 5/2019 | Seuss | |
| 2019/0188276 A1* | 6/2019 | Anerousis | G06F 40/30 |
| 2019/0287012 A1 | 9/2019 | Celikyilmaz et al. | |
| 2019/0333078 A1* | 10/2019 | Bala | G06Q 30/0201 |
| 2019/0349321 A1 | 11/2019 | Cai et al. | |
| 2020/0034922 A1 | 1/2020 | Wolfe, Jr. | |
| 2020/0111023 A1* | 4/2020 | Pondicherry Murugappan | G06F 40/295 |
| 2020/0279017 A1 | 9/2020 | Norton et al. | |
| 2020/0327151 A1* | 10/2020 | Coquard | G06F 16/3347 |
| 2020/0334520 A1* | 10/2020 | Chen | G06F 40/216 |
| 2022/0198272 A1* | 6/2022 | Liu | G06N 3/045 |

OTHER PUBLICATIONS

Bjorn Barz and Joachim Denzler. Deep learning on small datasets without pre-training using cosine loss. In IEEE Winter Conference on Applications of Computer Vision, WACV 2020. IEEE, 2020, 10 pages.

Iz Beltagy, Kyle Lo, and Arman Cohan. SciBERT: A pretrained language model for scientific text. In Proceedings of the 2019 Conference on Empirical Methods in Natural Language Processing and the 9th International Joint Conference on Natural Language Processing (EMNLP-IJCNLP), pp. 3606-3611, 2019.

Marcus D. Bloice, Christof Stocker, and Andreas Holzinger. Augmentor: An image augmentation library for machine learning. Technical report, ArXiv preprint server, 2017, 5 pages.

Yoonjung Choi, Yuchul Jung, and Sung-Hyon Myaeng. Identifying controversial issues and their sub-topics in news articles. In Proceedings of the 2010 Pacific Asia Conference on Intelligence and Security Informatics, PAISI'10, pp. 140-153, Berlin, Heidelberg, 2010. Springer.

Vinicio Desola, Kevin Hanna, and Pri Nonis. FinBERT: pre-trained model on sec filings for financial natural language tasks. Technical report, University of California at Berkeley, 2019, 11 pages.

Jacob Devlin, Ming-Wel Chang, Kenton Lee, and Kristina Toutanova. Bert: Pre-training of deep bidirectional transformers for language understanding. arXiv preprint arXiv:1810.04805, 2018, 16 pages.

Shiri Dori-Hacohen, David Jensen, and James Allan. Controversy detection in Wikipedia using collective classification. In Proceedings of the 39th International ACM SIGIR Conference on Research and Development in Information Retrieval, SIGIR '16, pp. 797-800, New York, NY, USA, 2016. Association for Computing Machinery.

Sergey Edunov, Myle Ott, Michael Auli, and David Grangier. Understanding back-translation at scale. arXiv preprint arXiv:1808.09381, 2018, 12 pages.

Stefan Feuerriegel and Helmut Prendinger. News-based trading strategies. Decision Support Systems, 90:65-74, 2016, 35 pages.

Gunnar Friede, Timo Busch, and Alexander Bassen. ESG and financial performance: aggregated evidence from more than 2000 empirical studies. Journal of Sustainable Finance & Investment, 5(4):210-233, 2015.

Soh Young In, Dane Rook, and Ashby Monk. Integrating alternative data (also known as ESG data) in investment decision making. Global Economic Review, 48(3):237-260, 2019.

Myungha Jang, John Foley, Shiri Dori-Hacohen, and James Allan. Probabilistic approaches to controversy detection. In Proceedings of the 25th ACM International on Conference on Information and Knowledge Management, CIKM '16, pp. 2069-2072, New York, NY, USA, 2016. Association for Computing Machinery.

Nikita Kitaev, Łukasz Kaiser, and Anselm Levskaya. Reformer: The efficient transformer. arXiv preprint arXiv:2001.04451, 2020, 12 pages.

Olga Kovaleva, Alexey Romanov, Anna Rogers, and Anna Rumshisky. Revealing the dark secrets of BERT. arXiv preprint arXiv:1908.08593, 2019, 10 pages.

Zhenzhong Lan, Mingda Chen, Sebastian Goodman, Kevin Gimpel, Piyush Sharma, and Radu Soricut. Albert: A lite BERT for self-supervised learning of language representations. arXiv preprint arXiv:1909.11942, 2019, 17 pages.

Jinhyuk Lee, Wonjin Yoon, Sungdong Kim, Donghyeon Kim, Sunkyu Kim, Chan Ho So, and Jaewoo Kang. BioBERT: pre-trained biomedical language representation model for biomedical text mining. arXiv preprint arXiv: 1901.08746, 2019, 7 pages.

Yonglong Lu, Nebojsa Nakicenovic, Martin Visbeck, and Anne-Sophie Stevance. Policy: Five priorities for the UN Sustainable Development Goals. Nature News, 520(7548):432, 2015.

X.-L. Meng and D. A. van Dyk. Seeking efficient data augmentation schemes via conditional and marginal augmentation. Biometrika, 86(2):301-320, 1999.

Timothy Nugent and Jochen L. Leidner. Risk mining: Company-risk identification from unstructured sources. In Carlotta Domeniconi, Francesco Gullo, Francesco Bonchi, Josep Domingo-Ferrer, Ricardo Baeza-Yates, Zhi-Hua Zhou, and Xindong Wu, editors, IEEE International Conference on Data Mining Workshops, ICDM Workshops 2016, Dec. 12-15, 2016, Barcelona, Spain, pp. 1308-1311. IEEE Computer Society, 2016.

Tim Nugent, Fabio Petroni, Natraj Raman, Lucas Carstens, and Jochen L Leidner. A comparison of classification models for natural disaster and critical event detection from news. In 2017 IEEE International Conference on Big Data (Big Data), pp. 3750-3759. IEEE, 2017.

Willem Schramade. Investing in the UN sustainable development goals: Opportunities for companies and investors. Journal of Applied Corporate Finance, 29(2):87-99, 2017.

Rico Sennrich, Barry Haddow, and Alexandra Birch. Improving neural machine translation models with monolingual data. arXiv preprint arXiv:1511.06709, 2015, 11 pages.

Ashish Vaswani, Samy Bengio, Eugene Brevdo, Francois Chollet, Aidan N. Gomez, Stephan Gouws, Llion Jones, Łukasz Kaiser, Nal Kalchbrenner, Niki Parmar, Ryan Sepassi, Noam Shazeer, and Jakob Uszkoreit. Tensor2Tensor for neural machine translation. CoRR, abs/1803.07416, 2018, 9 pages.

Yonghui Wu, Mike Schuster, Zhifeng Chen, Quoc V Le, Mohammad Norouzi, Wolfgang Macherey, Maxim Krikun, Yuan Cao, Qin Gao, Klaus Macherey, et al. Google's neural machine translation system: Bridging the gap between human and machine translation. arXiv preprint arXiv:1609.08144, 2016, 23 pages.

Qizhe Xie, Zihang Dai, Eduard Hovy, Minh-Thang Luong, and Quoc V Le. Unsupervised data augmentation. arXiv preprint arXiv: 1904.12848, 2019, 19 pages.

Adams Wei Yu, David Dohan, Minh-Thang Luong, Rui Zhao, Kai Chen, Mohammad Norouzi, and Quoc V Le. Qanet: Combining local convolution with global self-attention for reading comprehension. arXiv preprint arXiv: 1804.09541, 2018, 24 pages.

Yukun Zhu, Ryan Kiros, Rich Zemel, Ruslan Salakhutdinov, Raquel Urtasun, Antonio Torralba, and Sanja Fidler. Aligning books and movies: Towards storylike visual explanations by watching movies and reading books. In Proceedings of the IEEE International Conference on Computer Vision, pp. 19-27, 2015.

Jacob Devlin et al., "BERT: Pre-Training of Deep Bidiractional Transformers for Language Understanding", arxiv.org, Cornell University Library, Oct. 11, 2018, 14 pages.

"International Search Report and written opinion, PCT Application No. PCT/IB2020/055261 filed date Jun. 4, 2020", dated Aug. 28, 2020, 11 pages.

N. G. Poison. Convergence of Markov chain monte carlo algorithms. In J. M. Bernardo, J. O. Berger, A. P. Dawid, and A. F. M. Smith, editors, Bayesian Statistics 5—Proceedings of the Fifth Valencia International Meeting, pp. 297-321, 1996.

(56) References Cited

OTHER PUBLICATIONS

Office Action issued in related U.S. Appl. No. 17/070,500, dated Mar. 22, 2023.

* cited by examiner

141

Entity Name Input
802

| Headline | Classification | Confidence |
|---|---|---|
| Headline 804A | None | 13% |
| Headline 804B | None | 7% |
| Listeria lawsuit filed against ABC Company | Customer Health & Safety | 73% |
| Headline 804N | None | 6% |

Entity Name Input
802

| Headline | Classification | Confidence |
|---|---|---|
| Listeria lawsuit filed against ABC Company | Customer Health & Safety | 73% |
| Listeria lawsuit filed against ABC Company. A lawsuit was filed today against ABC Company, whose store was the source of a Listeria outbreak between June and August, 2019. The lawsuit was filed in the County Superior Court on behalf of a resident who became ill and was hospitalized after consuming foods purchased at the ABC Company. | | |

Feedback input
810

FIG. 9

MACHINE-LEARNING NATURAL LANGUAGE PROCESSING CLASSIFIER FOR CONTENT CLASSIFICATION

RELATED APPLICATIONS

This application claims priority to U.S. Provisional Patent Application No. 62/857,417, filed on Jun. 5, 2019, the content of which is incorporated by reference in its entirety herein.

BACKGROUND

Natural language processing (NLP) tasks may be facilitated by language modeling. For example, a natural language model may be used in query-response systems and/or other computational NLP tasks.

SUMMARY

The disclosure relates to computer-readable media, systems and methods that improve the classification of content into one or more topics based on a machine-learning natural language processing (ML-NLP) classifier. The ML-NLP classifier may use language models that may be trained from a corpus of data that includes natural language. One issue that may arise in training the language models used by the ML-NLP classifier is that natural language used in one type of content may be different than language used in another type of content. For example, domain-specific content may have different word distributions and terminologies than language patterns that may appear in general (non-specific) content. In particular, natural language appearing in financial news documents may be different than natural language appearing in online encyclopedias, general news articles, and the like. Thus, while a language model trained using unsupervised machine-learning from general content may be able to perform various natural language processing tasks, this language model may not be optimized for modeling natural language in domain-specific content. Furthermore, the language model may not be able to classify content as including specific topics of interest that may relate to domain-specific content.

The disclosure may improve classification of content into specific topics based on training (which may be unsupervised) a general language model using a general corpus, further training (which may be unsupervised) the general language model using a domain-specific corpus to generate a domain-specific language model, and fine-tuning the domain-specific language model using supervised machine-learning on a topic-specific corpus, which may be annotated with topic labels. Upon training based on the general corpus, the ML-NLP classifier may have learned a general language model that models language patterns used in a broad range of subject matter found in the general corpus. Modeling language patterns may include, for example, learning word representations and being able to predict a missing word in a sentence, linking two sentences, and/or other otherwise understanding language structure or content in natural language text.

Upon further training based on the domain-specific corpus, the ML-NLP classifier may have learned a domain-specific language model that augments the general language model such that the ML-NLP classifier may model language patterns used in a particular domain of information. Upon fine-tuning based on the topic-specific corpus, the ML-NLP classifier may have learned a topic-specific language model that augments the domain-specific language model such that the ML-NLP classifier may model language patterns used in content relating to particular topics.

Given a set of topics of interest that may relate to a domain of information, the ML-NLP classifier having the topic-specific language model may be able to classify content into one or more of the topics of interest more effectively than the domain-specific language model. Likewise, the domain-specific language model may be able to classify content into one or more of the topics of interest more effectively than the general language model. Thus, as the ML-NLP classifier is trained on the general corpus, further trained on the domain-specific corpus, and still further trained (fine-tuned) on the topic-specific corpus, the language model learned by the ML-NLP classifier may become increasingly able to classify content according to topics of interest found in the topic-specific corpus.

The ML-NLP classifier may be used in various contexts. For example, the ML-NLP classifier may classify domain-specific content, which may be streamed in real-time. A user may wish to obtain or otherwise be alerted to the domain-specific news content when the news content relates to one or more topics of interest to the user. In a particular example, the user may wish to obtain financial news content about a company that relates to a topic of interest, such as an environmental, social, and/or governance (ESG) topic. In some examples, the financial news content may include financial news relating to a financial domain of information, the domain-specific corpus may include a finance-specific corpus of documents or other data relating to finance, and the topic-specific corpus may include data labeled according to whether the data relates to an ESG topic.

The ML-NLP classifier, being further trained on the financial-specific corpus, may model language used in the financial documents. Thus, the ML-NLP classifier may be able to model the financial news more effectively than when the ML-NLP classifier is trained only on the general corpus. Likewise, the ML-NLP classifier may be able to model the topic-specific content more effectively based on supervised machine-learning from content tagged with topic labels than when the ML-NLP classifier is trained only on the finance-specific corpus.

BRIEF DESCRIPTION OF THE DRAWINGS

Features of the present disclosure may be illustrated by way of example and not limited in the following Figure(s), in which like numerals indicate like elements, in which:

FIG. 8 illustrates an example of a graphical user interface (GUI) of presenting content classified by the ML-NLP classifier.

FIG. 9 illustrates an example of a GUI of receiving feedback regarding a classification by the ML-NLP classifier.

DETAILED DESCRIPTION

Figure 1:
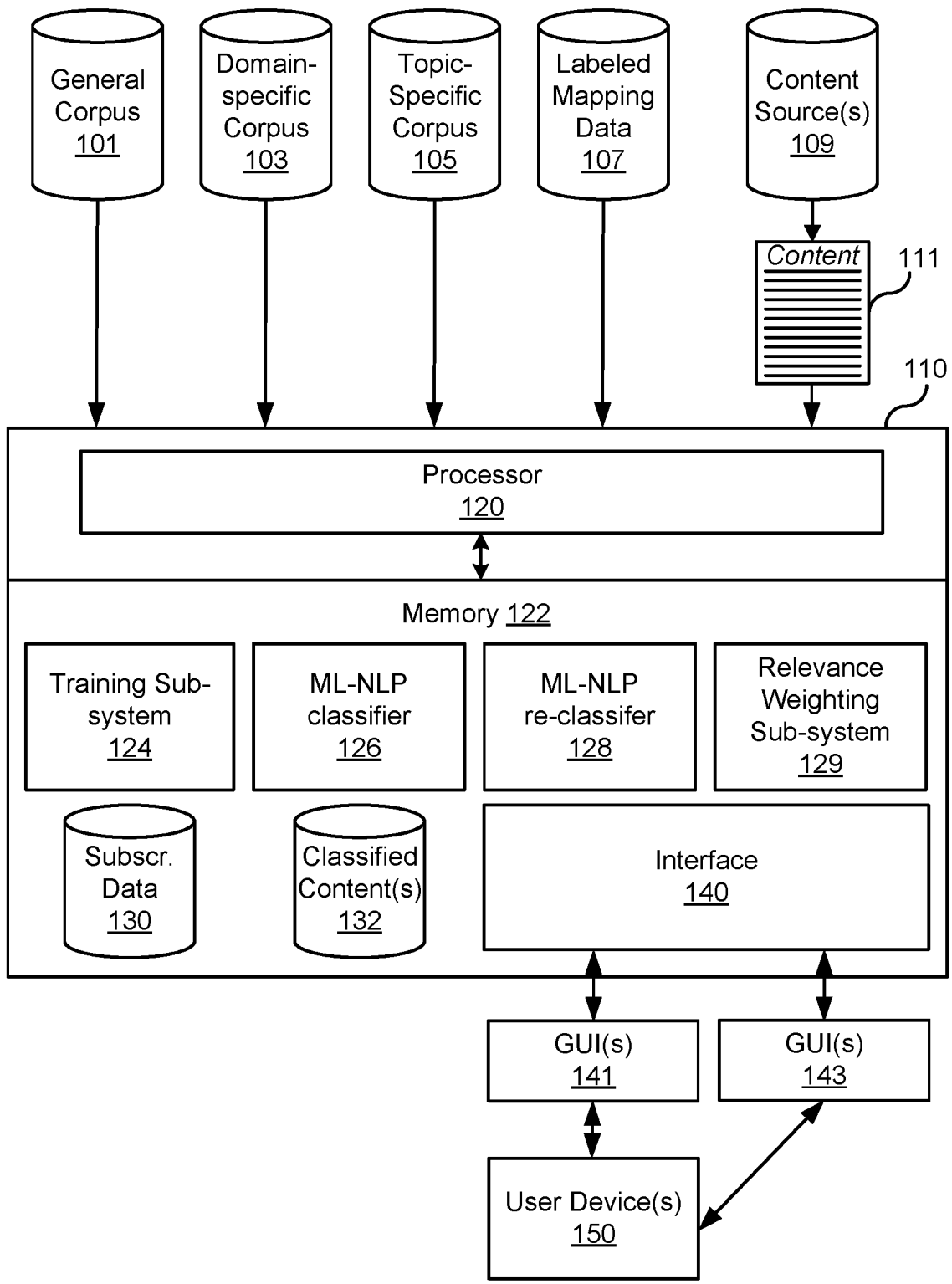
FIG. 1 illustrates a block diagram of an example of a system that includes a computer system for training, fine-tuning, and using a machine-learning natural language processing (ML-NLP) classifier to classify content.

FIG. 1 illustrates a block diagram of an example of a system 100 for training, fine-tuning, and using a machine-learning natural language processing (ML-NLP) classifier 126 to classify content 111. The system 100 may include a general corpus 101, a domain-specific corpus 103, a topic-specific corpus 105, labeled mapping data 107, content source(s) 109 that provide the content 111, a computer system 110 that trains and uses the ML-NLP classifier 126, user devices 150, and/or other components.

The general corpus 101 may include unannotated text relating to non-specific subject matter. For example, the general corpus 101 may include the English language Wikipedia™ corpus of data and the BookCorpus describe by Zhu et al., 2015, totaling approximately 3,300 million words.

The domain-specific corpus 103 may include content that is specific to a domain. For example, the domain-specific corpus 103 may include content that is specific to financial news, although other types of domains such as sports or politics may be used as well. One example of the domain-specific corpus 103 may include the Reuters™ News Archive (RNA), which may include Reuters™ articles published between 1996 and 2019. In some examples, the domain-specific corpus 103 may be filtered using metadata to ensure that only English language articles with Reuters™ topic codes that matched company news, corporate events, government finances or economic news are retained. In some examples, articles using topic codes and headline keywords that were news summaries, highlights, digests, and market round-ups may be excluded. Such articles typically contain list or bullet points of unrelated news headlines which are unsuitable for next sentence prediction or other NLP training. Some financial news articles may include contain "structured" data in the form of American Standard Code for Information Interchange (ASCII) tables containing market data. These financial news articles may be excluded using a heuristic approach based on the fraction of non-alphabetical characters (>0.1) appearing in the tables or other "structured" data. The resulting domain-specific corpus after filtering may include 2.2 million articles and 715 million words.

The topic-specific corpus 105 may include content that is annotated into a plurality of topics. That is, each item in the topic-specific corpus may be labeled as relating to one or more of the plurality of topics. A topic may refer to subject matter to which natural language text relates. Content to be classified may relate to various topics, some or none of which may be a topic of interest. A domain may refer a broad grouping of subject matter. A domain may include multiple topics, and a topic may accordingly be part of a domain. In this way, the computer system 110 may correlate the language in a given item with a labeled topic to which the given item has been annotated (by a human annotator, for example) to fine-tune the ML-NLP classifier 126.

One example of the topic-specific corpus 105 may include a multi-class ESG dataset provided by Refinitiv®, which may include 31,605 news articles each annotated into one of 20 ESG controversy categories (an example of topics of interest) by analysts with backgrounds in finance and sustainable investing. Each article may include an ESG controversy that a specific company is implicated in, with the entire dataset covering a total of 4137 companies over the time range 2002-2019. Included among these 20 ESG categories may include a negative class generated by sampling articles relating to companies in the topic-specific corpus 105 in the same date range whose headlines did not match a controversy article.

Figure 3:
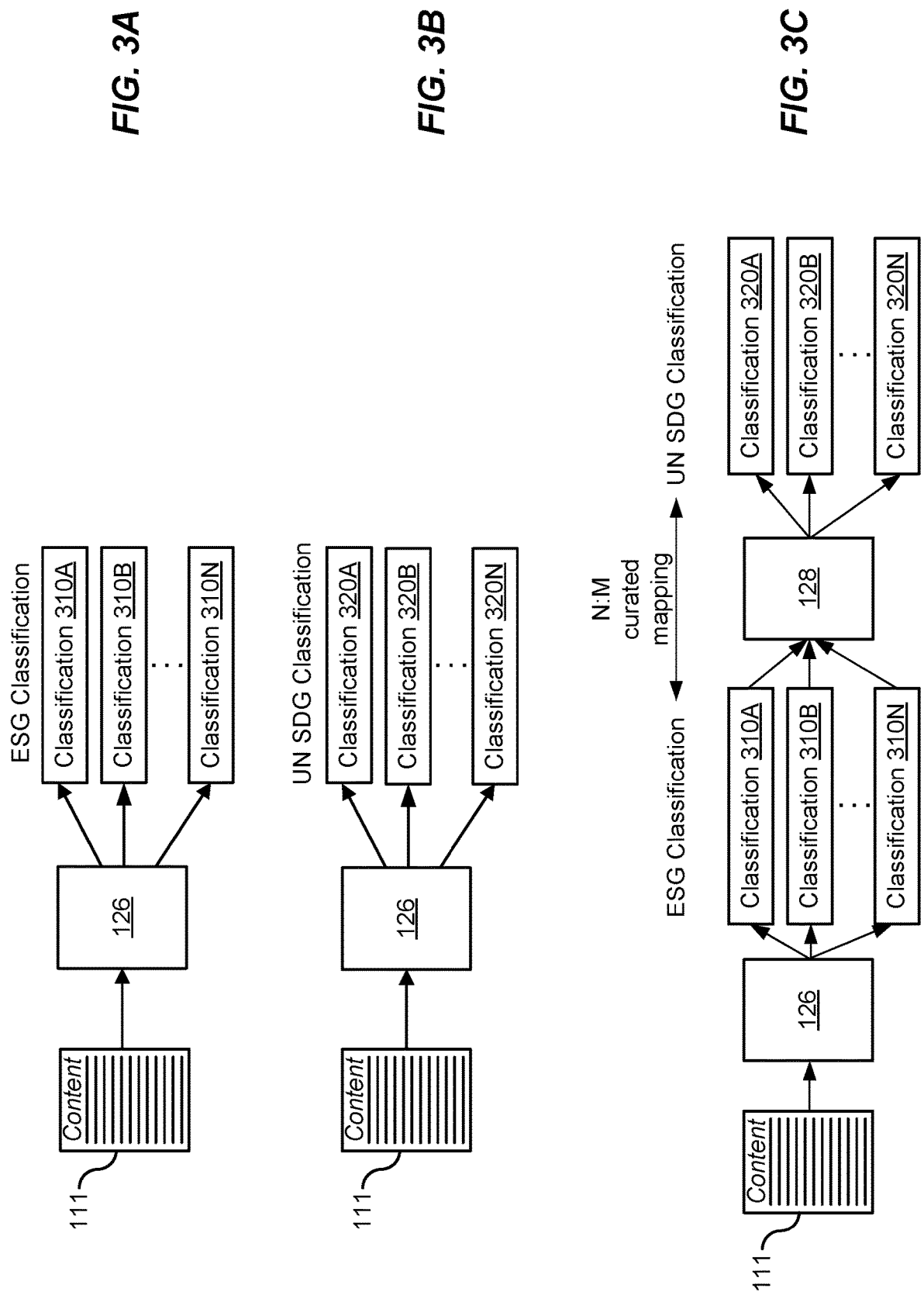
FIG. 3A illustrates an example of a flow diagram of classifying content into a plurality of classifications.
FIG. 3B illustrates an example of a flow diagram of classifying content into a second plurality of classifications.
FIG. 3C illustrates an example of a flow diagram of classifying content into a plurality of classifications and mapping the classifications into a second plurality of classifications.

The labeled mapping data 107 may include an annotated mapping of a first plurality of topics (such as the topics from the topic-specific corpus 105) to a second plurality of topics. The second plurality of topics may be different than the first plurality of topics. For example, the second plurality of topics may relate to a set of United Nations Sustainable Development Goals (UNSDG). For example, the second plurality of topics may relate to a set of United Nations Sustainable Development Goals (UNSDG), which have been created to inform policy-making, governance, business and other areas in order to steer humankind towards a sustainable society (sustainability, corporate responsible investing (CSR)). In some examples, the topic-specific corpus 105 may include articles annotated into one or more UNSDG topics similar to the manner in which the EST controversies are annotated. In this example, the ML-NLP classifier 126 may be trained to classify content 111 into one of the UNSDG topics. In some examples, because the first plurality of topics (such as relating to ESG data) may not be well-aligned with the second plurality of topics (such as relating to the UNSDGs), a reclassification may map categories from the first plurality of topics (such as relating to the ESG data) to the second plurality of topics (such as relating to the 17 UNSDGs) or a subset thereof. This may be performed by extensionally defining a mapping function m: C1→C2, such as illustrated in FIG. 3B. Alternatively, a supervised learning model can be trained on a training data-set to induce the most likely assignment for any c1 from C1 to c2 from C2, such as illustrated in FIG. 3C.

A content source 109 may provide content 111. In some examples, a content source 109 may include a real-time news source such as a real-time financial news source, in which case the content 111 may include news content such as a financial news article. In these examples, the computer system 110 may access streaming content and classify the streaming content in real-time for up-to-date classifications of the streaming content. Other types of content sources 109 and content may be used as well.

Examples herein will describe a financial domain and topics of interest in the context ESG and UNSDG topics such that content 111 in the financial domain may be classified into ESG and/or UNSDG topics. However, the foregoing examples are provided for illustrative purposes, as other types of domains and topics may be used to train, fine-tune, and use the ML-NLP classifier 126 and/or ML-NLP re-classifier 128. For example, the domain may include a sports domain and the topics of interest may relate to player health and/or other sports-related topics. In another example, the domain may include a politics domain and the topics of interest may include political scandal information about candidates and/or other politics-related topics.

The computer system 110 may include a server, a computer, or the like that trains (computationally processes training for) the ML-NLP classifier 126 and/or the ML-NLP re-classifier 128 based on the general corpus 101, the domain-specific corpus 103, the topic-specific corpus 105, the labeled mapping data 107, and/or other training data. The computer system 110 may include a processor 120, a memory 122, and/or other components.

The processor 120 may include a semiconductor-based microprocessor, a central processing unit (CPU), an application specific integrated circuit (ASIC), a field-programmable gate array (FPGA), and/or other suitable hardware device. The memory 122 may have stored thereon machine-readable instructions (which may also be termed computer readable instructions) that program the processor 120 (and therefore computer system 110) to execute various functions described herein with respect to the computer system 110. The memory 122 may be an electronic, magnetic, optical, or other physical storage device that includes or stores executable instructions. The memory 122 may be, for example, Random Access memory (RAM), an Electrically Erasable Programmable Read-Only Memory (EEPROM), a storage device, an optical disc, and the like. The memory may be a non-transitory machine-readable storage medium, where the term "non-transitory" does not encompass transitory propagating signals.

In some examples, the memory 122 may store a training sub-system 124, an ML-NLP classifier 126, an ML-NLP re-classifier 128, a relevance weighting sub-system 129, an interface 140, and/or other instructions. It should be noted that each of the foregoing instructions may be implemented in hardware instead of instructions that program the processor 120.

The training sub-system 124 may train the ML-NLP classifier 126 and/or the ML-NLP re-classifier 128. Examples of such training are discussed with respect to FIGS. 2 and 7. The ML-NLP classifier 126 may classify content 111 into one or more topics of interest. The ML-NLP re-classifier 128 may reclassify the content 111 from the one or more topics of interest to another set of one or more topics of interest. Examples of such classification are illustrated with respect to FIGS. 3A-3C and 5.

As used herein, an ML-NLP classifier (such as the ML-NLP classifier 126) may refer to a classification function that classifies content according to natural language text (words, phrases, and/or sentences) included in the content. Such classification function may be trained based on machine-learning (ML) using natural language processing (NLP) techniques to learn from training data, such as various corpuses of data and/or labeled mapping data that include natural language text.

Machine learning, or "ML", may refer to an algorithm or instruction that may train a classifier or other model based on a training dataset to learn from the training dataset. NLP techniques may refer to computationally processing natural language text to understand the meaning or structure (such as grammatical structure, sentence structure, and the like) of the natural language text. Thus, an ML-NLP classifier may refer to a classification function trained on a corpus of natural language text to understand the meaning or structure of content containing natural language text so that when new text is analyzed, the ML-NLP classifier may classify the new text based on an understanding learned from the corpus of natural language text.

"Classify" may refer to generating a classification of natural language text. A "classification" may refer to a probability that the natural language text relates to a particular topic. The ML-NLP classifier may be trained to classify the content into one or more classifications. That is, the ML-NLP classifier may be trained to determine a respective probability that the content relates to a corresponding topic.

The relevance weighting subsystem 129 may access a relevance score to content 111 and weight the one or more classifications based on the relevance score. The relevance score may indicate a likelihood that the content 111 relates to an entity of interest. Thus, a higher relevance score may result in a higher classification probability than a lower relevance score.

The interface 140 may include a service that accesses classifications from classified content 132 and/or other data, provides the classifications to user devices 150, receive feedback regarding the classifications from the user devices 150, and/or otherwise facilitate interaction with the classifications. For example, the interface 140 may include a RESTful (REST) Application Programming Interface (API), a Simple Object Access Protocol (SOAP) interface, and/or other type of interface that may provide access to the classifications and/or other data of computer system 110. In some examples, the interface 140 may interact with various graphical user interfaces (GUIs) 141, 143, which may be provided to and displayed at a user device 150. Examples of GUIs 141, 143 are respectively illustrated at FIGS. 8 and 9.

In some examples, the memory 140 may store subscription data 130 (illustrated as subscr. data 130), classified content(s) 132, and/or other data repositories. The subscription data 130 may include an identity of users, entities of interest, topics of interest, and/or other data. The identity of users may include an identity of users that wish to use the system 100 to access content 111 about entities in which the user has an interest. For example, a financial analyst may wish to access financial news content that relates to a specific company that the financial analyst is tracking. The computer system 110 may store the identity of the user in association with the identity of these entities of interest. Furthermore, the user may wish to access content 111 that relates to one or more topics of interest. Continuing the previous example, the financial analyst may wish to access financial news content that relates to the specific company and also discusses any ESG topics with which the company may be involved. The computer system 110 may store the identity of the user in association with the identity of the topics of interest.

In an example operation, the computer system 110 may access content 111, provide an input based on the content 111 to the ML-NLP classifier 126, generate a classification into the one or more topics of interest, and store the classifications in the classified content(s) 132. When a user logs onto the system via a user device 150, the computer system 110 may provide, via the interface 140 and GUI 141, data from the classified content(s) 132 that is relevant to the entities and/or topics of interest from the subscription data and/or as specified by the user. In some examples, the computer system 110 may provide, via the interface 140 and GUI 143, to receive feedback from the user regarding classification of content 111.

For example, the processor 120 may generate a general ML-NLP classifier 126 based on training from a general corpus 101, generate a domain-specific ML-NLP classifier 126 based on training from a domain-specific corpus 103, generate a tuned ML-NLP classifier 128 based on a topic-specific corpus 105, and generate a tuned ML-NLP re-classifier 128 based on labeled mapping data 107.

Figure 2:
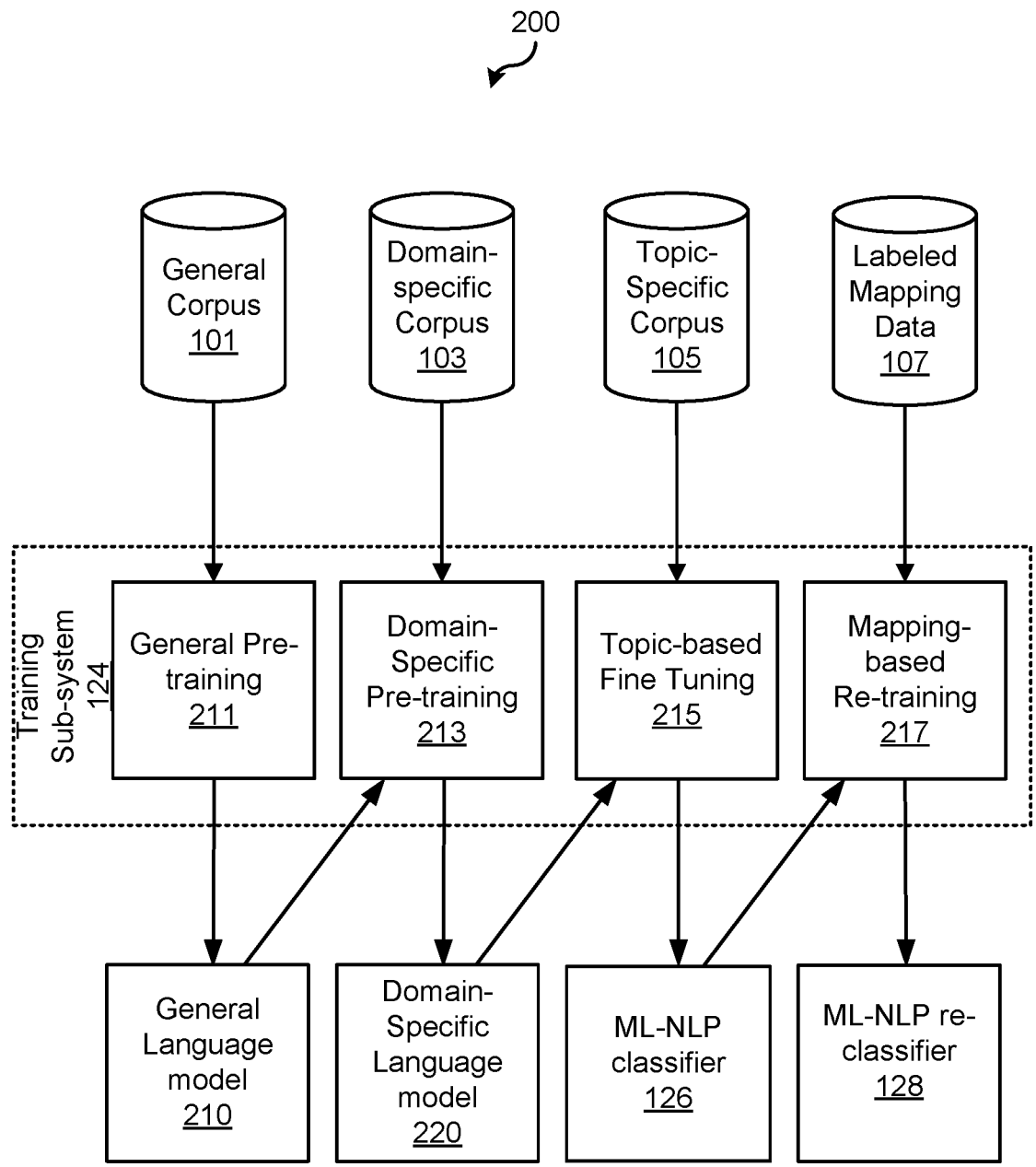
FIG. 2 illustrates an example of a flow diagram of training the ML-NLP classifier.

FIG. 2 illustrates an example of a flow diagram 200 of training an ML-NLP classifier 126. The processor 120 illustrated in FIG. 1 may execute training based on training algorithms or instructions stored at memory 122. Such training algorithms or instructions may include general pre-training 211, domain-specific pre-training 213, topic-based fine tuning 215, mapping-based re-training 217, and/or other training processes. As used herein, the term "pre-training" may refer to training and/or other activities that may occur prior to training the MLP-classifier 126.

General pre-training 211 may train a general language model 210 based on general corpus 101. One example of a general language model 210 may include a Bidirectional Encoder Representations from Transformers (BERT), which is described in "BERT: Pre-training of Deep Bidirectional Transformers for Language Understanding," Jacob Devin, Ming-Wei Chang, Kenton Lee, Kristina Toutanova (available at https [://]arxiv[.]org [/]abs[/] 1810.04805v2), the content of which is incorporated by reference in its entirety herein. BERT is a neural language model capable of learning word representations from large volumes of unannotated text. The BERT language model may include 12 layers, 12 attention heads, 768 hidden units, and 110 million parameters.

BERT embeddings are highly contextual due to its deep and bidirectional (i.e. left-to-right and right-to-left) formulation. General pre-training 211 may use a masked language model that learns to predicts words randomly masked from a sequence, and whether two sentences in a document naturally follow each other (next sentence prediction), and may leverage a "transformer" encoder/decoder architecture which uses attention mechanisms to forward a more complete picture of the whole sequence to the decoder at once, rather than sequentially.

Domain-specific pre-training 213 may train, using the domain-specific corpus 103, a domain-specific language model 220, which may augment and build upon the general language model 210. In some examples of domain-specific pre-training 213, the domain-specific corpus 103 may be converted into TensorFlown™ record format for masked language modelling (LM) and next sentence prediction at sequence lengths of 128 and 512 tokens with a duplication factor of 10 and masked LM probability of 0.15. Sentence boundary disambiguation may be performed.

In some examples, the masked LM results may be post-processed to correct errors in specific formatting that may be included in the domain-specific corpus 103. For example, documents in the domain-specific corpus 103 may include Reuters Instrument Codes (RICs), which may include symbols used to identify financial instruments or indices. Examples of a RIC format may include a ticker symbol, which may be followed by a period and exchange code based on the name of the associated stock exchange enclosed within angle brackets. For example, the RIC "<IBM.N>" refers to IBM being traded on the New York Stock Exchange.

In some examples, domain-specific pre-training 213 may be performed using a maximum sequence length of 128 for 5 million steps, using 50,000 warm-up steps, a learning rate of 1e-5 and a batch size of 256. In some examples, domain-specific pre-training 213 may further include additional pre-training using a maximum sequence length of 512 for a further one million steps, since long sequences are mostly needed to learn positional embeddings which can be learned relatively quickly.

Topic-based fine-tuning 215 may train the ML-NLP classifier 126 based on the topic-specific corpus 105 and the domain-specific language model 220. To train the ML-NLP classifier 126, an output layer may be appended onto the standard BERT architecture, before topic-based fine-tuning 215.

Table 1 includes an example of content 111, such as from a news article, may include natural language text:

*Listeria* lawsuit filed against ABC Company. A lawsuit was filed today against ABC Company, whose store was the source of a *Listeria* outbreak between June and August, 2019. The lawsuit was filed in the County Superior Court on behalf of a resident who became ill and was hospitalized after consuming foods purchased at the ABC Company.

When used for inference on the foregoing example of content 111 in Table 1, a correct classification would result in an appropriate ESG topic ("Customer Health & Safety"), or UNSDG(s) ("Goal 2—Good health and well-being"), being predicted.

In some examples, topic-based fine-tuning 215 may include using cross-entropy loss after softmax activation for the multi-class task, and after sigmoidal activation for the multi-label task, respectively. Topic-based fine-tuning 215 may be run for 40 epochs with a dropout probability of 0.1, batch size of 64, maximum sequence lengths of 128, 256 and 512 tokens, and learning rates of 1e-5 and 1e-6. In some examples, 3-fold cross validation for all tasks may be performed.

In some examples, topic-based fine-tuning 215 may use a support vector machine (SVM) classifier with radial basis function (RBF) kernel as a baseline, since SVMs may perform relatively well on small news-based datasets. Topic-based fine-tuning 215 may use a one-vs-one scheme with term frequency-inverse document frequency (TF-IDF) features and sub-linear term frequency scaling. RBF gamma and regularization parameters are optimized using a grid search.

Mapping-based re-training 217 may map a first set of topics to a second set of topics based on labeled mapping data 107, which may include annotated data that maps from the first set of topics (such as the ESG topics) to a second set of topics (such as the UNSDG topics).

FIG. 3A illustrates an example of classifying content 111 into a plurality of classifications 310A-N. Each classification 310A-N may refer to a respective topic of interest to which the content 111 relates and a corresponding probability that the content 111 relates to the respective topic of interest. For example, referring to the content 111 illustrated in Table 1, the ML-NLP classifier 126 may classify the content 111 into a classification 310A that indicates that the content 111 relates to an ESG topic ("Customer Health & Safety") and a probability of such classification being correct. Other classifications 310B-N may similarly refer to probabilities that the content 111 relates other topics, such as other ESG topics. In this example, the ML-NLP classifier 126 may be trained using a topic-specific corpus 105 that is annotated with ESG topic labels.

FIG. 3B illustrates an example of classifying content 111 into a second plurality of classifications 320A-N. Each classification 320A-N may refer to a respective topic of interest to which the content 111 relates and a corresponding probability that the content 111 relates to the respective topic of interest. For example, referring to the content 111 illustrated in Table 1, the ML-NLP classifier 126 may classify the content 111 into a classification 320A that indicates that the content 111 relates to a UNSDG(s) ("Goal 2—Good health and well-being") and a probability of such classification being correct. Other classifications 320B-N may similarly refer to probabilities that the content 111 relates other topics, such as other UNSDG topics. In this example, the ML-NLP classifier 126 may be trained using a topic-specific corpus 105 that is annotated with UNSDG topic labels.

FIG. 3C illustrates an example flow diagram of classifying content into a plurality of classifications 310A-N and mapping the classifications into a second plurality of classifications 320A-N. In this example, the ML-NLP classifier 126 may classify the content 111 into a first plurality of classifications 310A-N (such as referring to ESG topics) and the ML-NLP re-classifier 128 may map the first plurality of classifications 310A-N to the second plurality of classifications 320A-N. Such mapping may include a N:M many-to-many relationship, where "N" number of classifications 310A-N may map to "M" number of classifications 320A-N.

Figure 4:
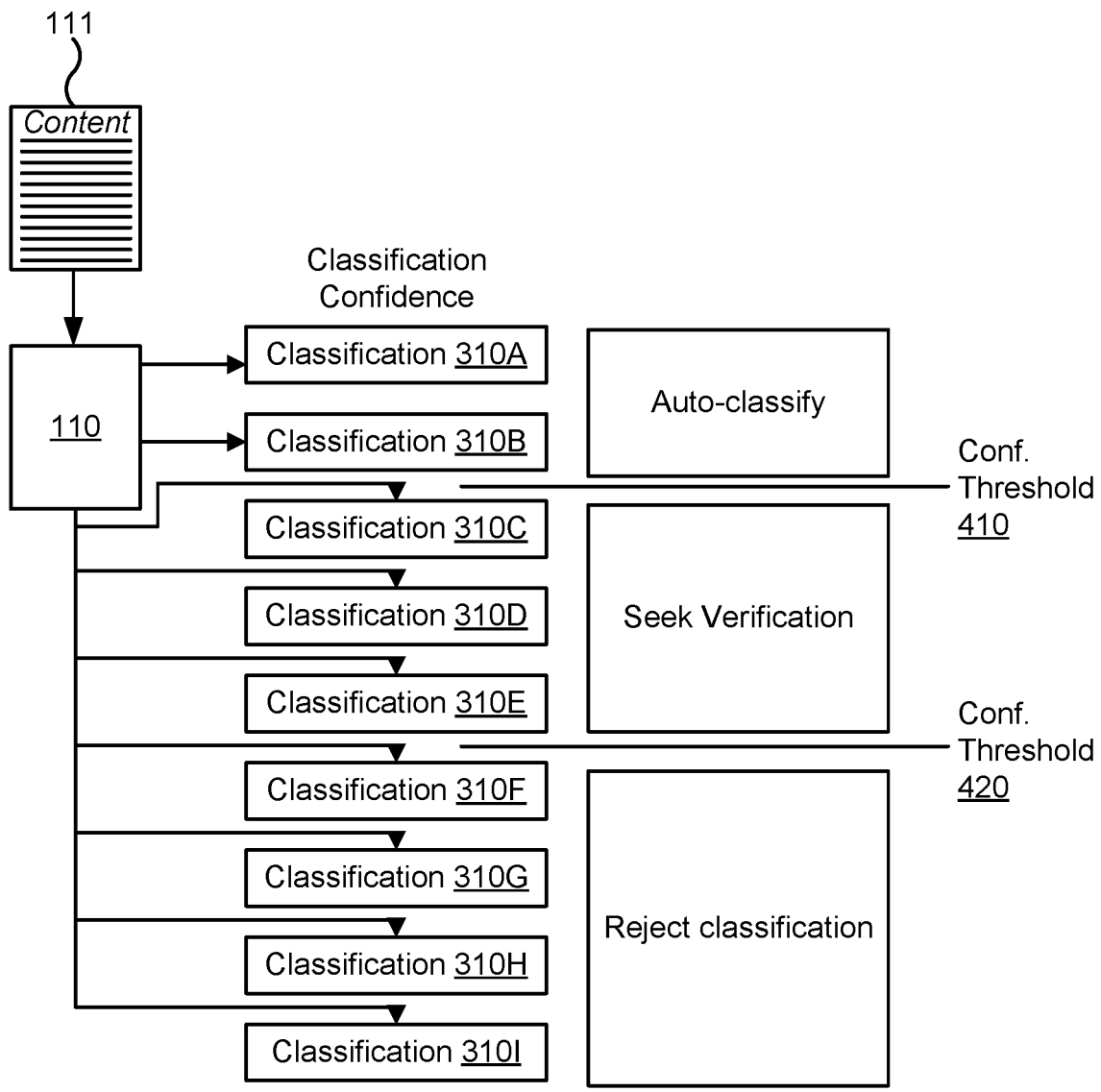
FIG. 4 illustrates an example of confidence thresholds used to determine whether to automatically classify content, flag content for verification, or determine that the content does not relate to a topic of interest.

FIG. 4 illustrates an example of confidence thresholds 410, 420 used to determine whether to automatically classify content 111, flag content 111 for verification, or determine that the content 111 does not relate to a topic of interest. Other numbers of classification thresholds may be used as well.

As illustrated, the computer system 110 may access content 111 and classify the content 111 into a plurality of classifications 310A-N. That is, computer system 110 may provide an input based on the content 111 to an ML-NLP classifier (such as ML-NLP classifier 126 illustrated in FIG. 1) and determine a probability that the content 111 relates to a respective classification 310. For example, the classification 310A may include a probability that the content 111 relates to a "Customer Health & Safety" ESG topic and/or a "Goal 2—Good health and well-being" UNSDG topic. The classification 310B may include a probability that the content 111 relates to a "Business Ethics" ESG topic and/or a "Peace and Justice Strong Institutions" UNSDG topic. Other classifications 310C-N may include similar probabilities for other topics.

In some examples, the computer system 110 may compare each probability to confidence thresholds 410, 420, and/or other thresholds. If the probability is above a first confidence threshold 410, then the computer system 110 may automatically classify the content 111 into the corresponding classification 310. For example, the probabilities of classifications 310A, B meet and/or exceed the confidence threshold 410 and will be automatically classified as relating to their respective topics. On the other hand, if the probability is below the first confidence threshold 410 but meets and/or exceeds the second confidence threshold 420, then the computer system 110 may flag the respective classification 310 for verification and/or classification by a human user, such as via GUI 143 illustrated at FIG. 9. Such flagging may include storing a bit field or other indication in the classified data 130 repository in association with the content 111 and/or the classification. An example of user-based classification is described in U.S. patent application Ser. No. 15/478,772, filed on Apr. 4, 2017, entitled, "Self-Service Classification System," the content of which is incorporated by reference in its entirety herein. In some examples, such user-based classification may be used for verification and/or classification.

If the probability is below the second confidence threshold 420, then the respective classification 310 may be rejected. If all the classifications 310 for a given content 111 is rejected, then the content 111 may be considered not relevant to any of the topics of interest.

Figure 5:
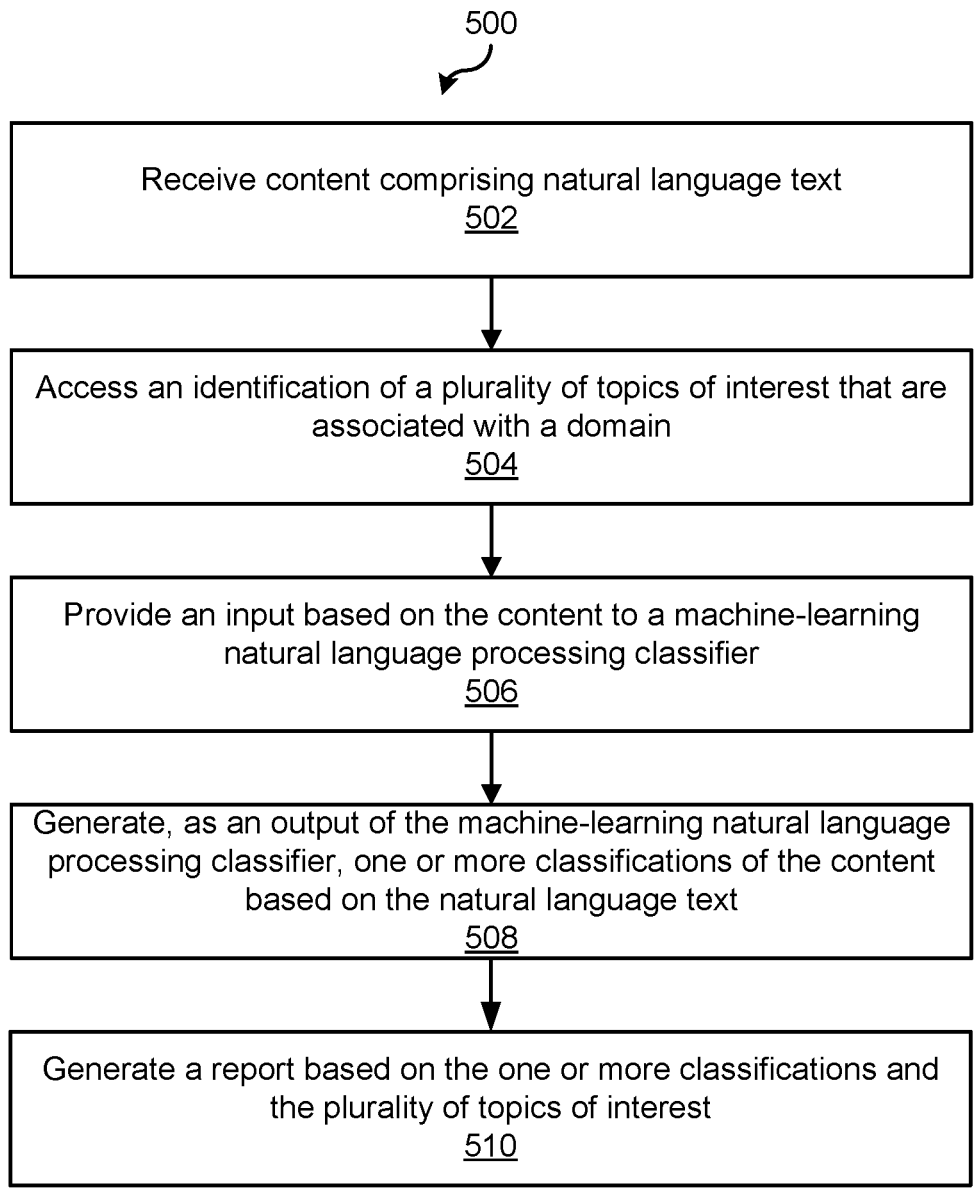
FIG. 5 illustrates a flow diagram of an example method of classifying content based on a ML-NLP classifier.

FIG. 5 illustrates a flow diagram of an example method 500 of classifying content (such as content 111) based on a ML-NLP classifier (such as ML-NLP classifier 126).

At 502, the method 500 may include receiving the content, which may include natural language text. In some examples, the content may include news content regarding one or more entities. In some examples, the content may include one or more topics, some or all of which may be a topic of interest to a user.

At 504, the method 500 may include accessing an identification of a plurality of topics of interest that are associated with a domain. For example, the plurality of topics of interest may include topics that are of interest to the user. The user may be subscribed to access news items or other content that relate to an entity of interest and include one or more of the plurality of topics of interest. In some examples, the plurality of topics of interest may be associated with a domain in that they may impact or otherwise relate to the domain. For example, the domain may include finance and the plurality of topics of interest may impact finances of an entity of interest such as a company.

At 506, the method 500 may include providing an input based on the content to the ML-NLP classifier, the ML-NLP classifier pre-trained on a general corpus of data, further pre-trained a domain-specific corpus of data specific to the domain, and then fine-tuned on a topic-specific corpus of data labeled according to the plurality of topics of interest. For example, the natural language text from the content may be provided as input to the ML-NLP classifier. In some examples, the content may be pre-processed prior to input to the ML-NLP classifier. For example, the pre-processing may include reformatting the content for input to the ML-NLP classifier.

At 508, the method 500 may include generating, as an output of the machine-learning natural language processing classifier, one or more classifications of the content based on the input, each classification indicating a respective probability that the content relates to a corresponding topic from among the plurality of topics of interest.

At 510, the method 500 may include generating a report based on the one or more classifications. In some examples, the report may be provided via a graphical user interface. In some examples, the report may be provided on-demand in response to a user request, periodically (pushed) to users who subscribe to the report, and/or at other times.

In some examples, the method 500 may further include, for each of the one or more classifications of the content: compare the respective probability that the content relates to the corresponding topic with a confidence threshold (such as a confidence threshold 410 illustrated in FIG. 4). The method 500 may further include determining whether the content relates to the corresponding topic based on the comparison and populating the report based on the determinations. For example, the report may indicate that the content has been determined to relate to the corresponding topic when the respective probability exceeds the confidence threshold, indicating that the ML-NLP classifier is confident that the content relates to the corresponding topic. On the other hand, the report may indicate that the content does not relate to the corresponding topic if the respective probability does not exceed the confidence threshold.

In some examples, as further described with respect to FIG. 4, determining whether the content relates to the corresponding topic may include comparing the respective probability to one or more confidence thresholds. For example, the method 500 may include determining that the respective probability meets or exceeds a first confidence threshold (such as confidence threshold 410), and automatically classifying the content as relating to the corresponding topic based on the determination that the content meets or exceeds the first confidence threshold.

In some examples, the method 500 may further include determining that the respective probability does not meet or exceed the first confidence threshold (such as confidence threshold 410) but meets or exceeds a second confidence threshold (such as confidence threshold 420) lower than the first confidence threshold. The method 500 may include flagging the content to be manually verified as relating to the corresponding topic based on the determination that the respective probability does not meet or exceed the first confidence threshold but meets or exceeds the second confidence threshold. For example, the second confidence threshold may indicate that the respective probability that the content relates to corresponding topic may be high but not sufficiently high to make an automatic determination that the classification is correct. Thus, classifications that exceed the second confidence threshold but are below the first confidence threshold may therefore be candidates for manual verification by a human user. Such verification may be in the positive or negative, in either case the content may be labeled accordingly and added to a labeled training dataset for retraining the ML-NLP classifier.

In some examples, the method 500 may include determining that the respective probability does not meet or exceed a first confidence threshold and does not meet or exceed a second confidence threshold lower than the first confidence threshold. The method 500 may further include determining that the content does not relate to the corresponding topic based on the determination that the respective probability does not meet or exceed the first confidence threshold and does not meet exceed the second confidence threshold.

In some examples, the method 500 may include determining that none of the respective probabilities meet or exceed the second confidence threshold, and removing the content from being considered for a pool of content determined to be relevant to the plurality of topics of interest. For example, if the content is determined to not be relevant to any of the plurality of topics of interest (based on comparison to one or more confidence thresholds), then the method 500 may remove the content from the pool. Content in the pool may be considered potentially relevant to one or more of the plurality of topics and may therefore be presented in the report provided to a user.

In particular, in some examples, the content may relate to an entity. The method 500 may further include receiving a request for contents relating to the entity and the plurality of topics of interest. Content determined to be related to one or more of the plurality of topics of interest and to the entity may be provided in the report, which may be provided in a GUI 141 and/or 143 responsive to the request. Thus, in some examples, the content may be determined to be related to multiple topics of interest.

In some examples, the method 500 may include reclassifying the content into one or more of a second plurality of topics of interest. Such reclassification may include mapping a classification from a first topic of interest to one or more of the second plurality of topics of interest based on the labeled mapping data 107.

In some examples, to mitigate effects of any insufficiency in training data, such as the domain-specific corpus of data, the topic-specific corpus of data, and/or other training data, the method 500 may include translating, based on a machine translation, the domain-specific corpus of data from a first language to a second language. The method 500 may further include translating, via the machine translation, the domain-specific corpus of data from the second language back to the first language to generate a second version of the domain-specific corpus of data. Because of the translation, and back-translation, the second version of the domain-specific corpus of data is different than the domain-specific corpus of data due to word substitutions and other changes that may occur during the machine translation. As such, the method 500 may include expanding the domain-specific corpus of data based on the second version of the domain-specific corpus of data. In these examples, the ML-NLP classifier may be trained based on the second version of the domain-specific corpus of data.

In some examples, the method 500 may include receiving an identification of one or more new topics of interest, updating the plurality of topics of interest based on the one or more new topics of interest, and retraining the machine-learning natural language processing classifier based on the updated plurality of topics. For example, a new or revised topic-specific corpus 105 may be received on which the ML-NLP classifier may be retrained.

In some examples, the method 500 may include accessing a relevance score that indicates a level of relevance of the content to an entity of interest, and weighting the respective probabilities based on the relevance score. The relevance score may be based on a level of relevance of content ascribed to the entity of interest. In some examples, such relevance to the entity may be determined based on U.S. patent application Ser. No. 15/844,834, filed on Dec. 18, 2017, entitled, "APPARATUSES, METHODS AND SYSTEMS FOR ADJUSTING TAGGING IN A COMPUTING ENVIRONMENT," the content of which is incorporated by reference in its entirety herein.

In some examples, the method 500 may include receiving, via a graphical user interface (such as GUI 141), an identification of at least a first topic, identifying identify, one or more content that was classified into the first topic, and providing data based on the identified one or more content. For example, the provided data may include the content or portion of the content, the classification of the content into the first topic (the probability that the content relates to the first topic), and/or other information.

In some examples, the method 500 may include receiving, from a manual curator (such as via a graphical user interface 153), feedback comprising an indication of whether or not the content was correctly identified as being related to a particular topic of interest from among the plurality of topics of interest, and adding the content to the topic-specific corpus as labeled training data based on the indication. For example, if the feedback indicates the content was not correctly identified as relating to the particular topic of interest, the content may be labeled as not relating to the particular topic of interest. On the other hand, if the feedback indicates the content was correctly identified as relating to the particular topic of interest, the content may be labeled as relating to the particular topic of interest. In either instance, the topic-specific corpus may be accordingly updated as feedback is received so that the ML-NLP classifier may be retrained and periodically improved based on further training on additional labeled training data.

Figure 6:
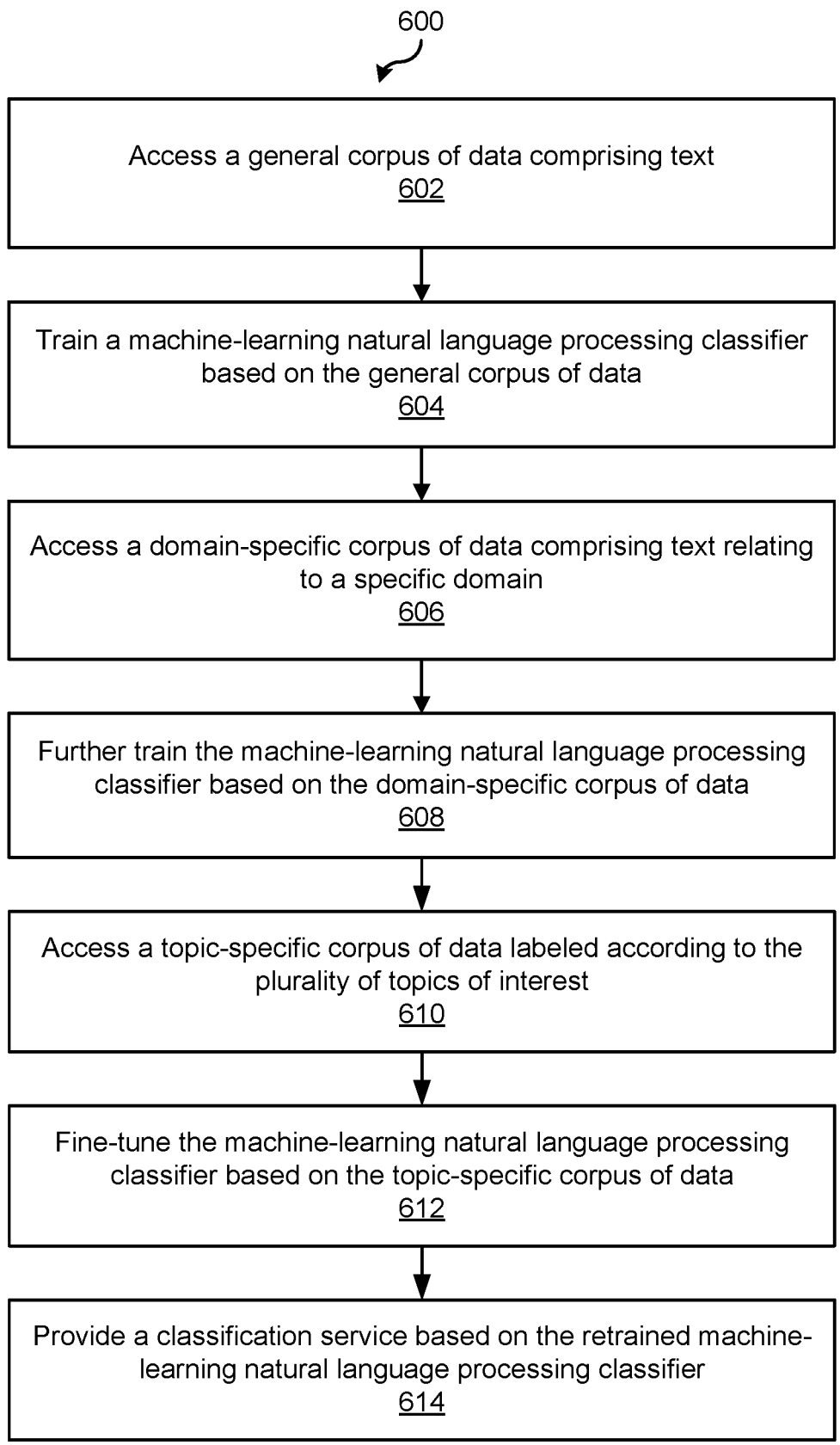
FIG. 6 illustrates a flow diagram of an example method of training a ML-NLP classifier.

FIG. 6 illustrates a flow diagram of an example method 600 of training a ML-NLP classifier.

At 602, the method 600 may include accessing a general corpus of data (such as general corpus 101) comprising text. In some examples, the method 600 may include expanding the general corpus of data to increase an amount of training data from the general corpus of data.

At 604, the method 600 may include training a machine-learning natural language processing (ML-NLP) classifier based on the general corpus of data. It should be noted that instead of training the ML-NLP based on the general corpus of data, the method 600 may include accessing a pre-trained ML-NLP based on the general corpus of data and therefore omit blocks 602 and 604.

At 606, the method 600 may include accessing a domain-specific corpus of data (such as domain-specific corpus 103) comprising text relating to a specific domain. In some examples, the method 600 may include expanding the domain-specific corpus of data to increase an amount of training data from the domain-specific corpus of data At 608, the method 600 may include retraining the ML-NLP classifier based on the domain-specific corpus of data to train the machine-learning model. At 610, the method 600 may include accessing a topic-specific corpus of data (such as topic-specific corpus 105) labeled according to the plurality of topics of interest. In some examples, the method 600 may include expanding the topic-specific corpus of data to increase an amount of training data from the topic-specific corpus of data.

At 612, the method 600 may include fine-tuning the ML-NLP classifier based on the topic-specific corpus of data. At 614, the method 600 may include providing a classification service based on the retrained ML-NLP classifier, wherein the classification service generates a respective classification of whether or not content relates to one or more of a plurality of topics of interest associated with a domain.

In some examples, the method 600 may include accessing labeled mapping data (such as labeled mapping data 107) that includes a mapping between the plurality of topics of interest and a second plurality of topics interest, and mapping the plurality of topics of interest to the second plurality of topics of interest, wherein the content is classified according to the second plurality of topics of interest based on the mapped plurality of topics of interest.

Figure 7:
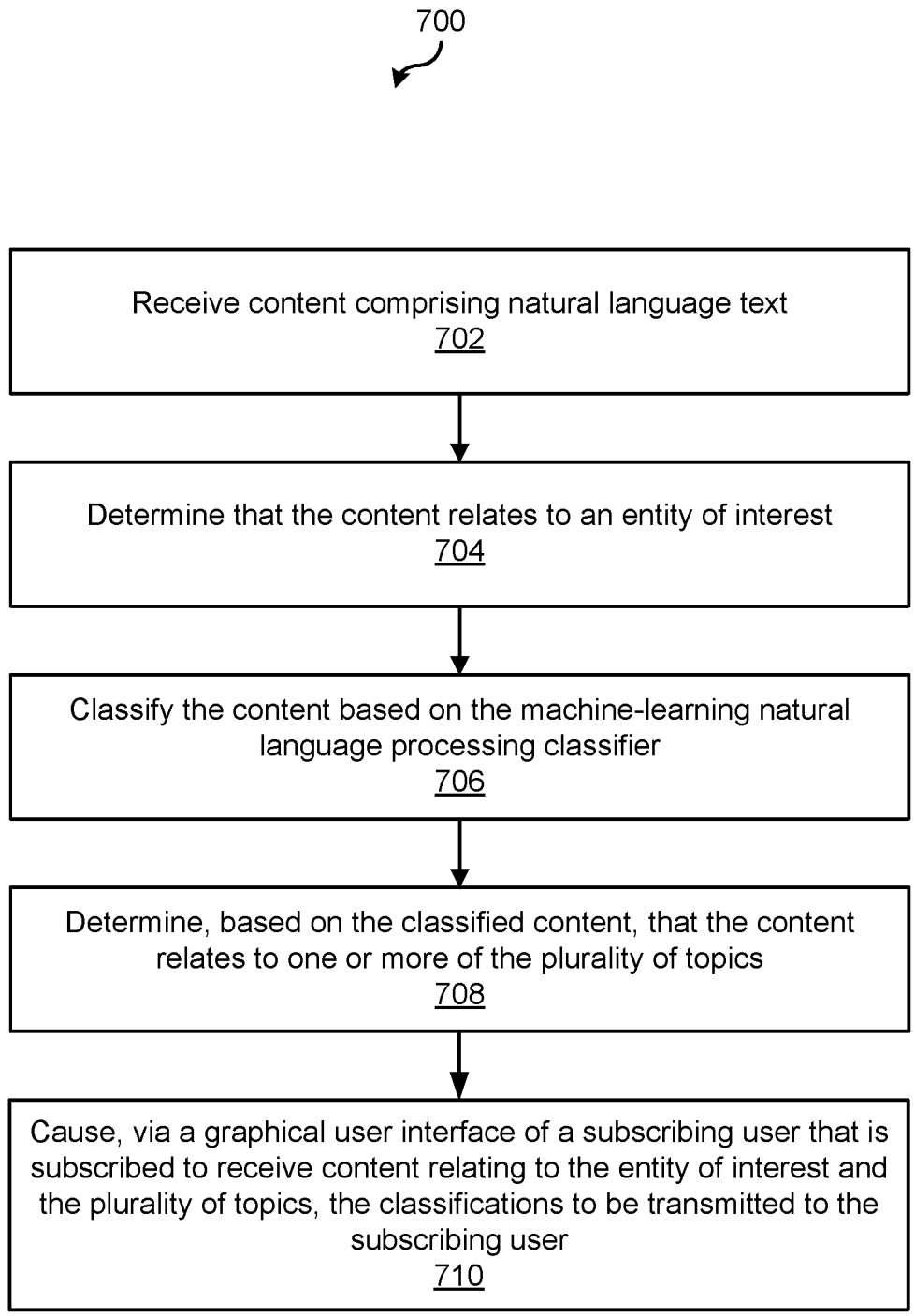
FIG. 7 illustrates a flow diagram of an example method of classifying content relating to entities of interest based on a ML-NLP classifier.

FIG. 7 illustrates a flow diagram of an example method 700 of classifying content such as content 111 relating to entities of interest based on a ML-NLP classifier such as ML-NLP classifier 126. At 702, the method 700 may include receiving the content. At 704, the method 700 may include determining that the content relates to an entity of interest. For example, the method 700 may include performing named entity recognition on the content to identify one or more entities referred to in the content, and comparing the one or more entities to a listing of entities of interest, wherein the determination that the content relates to the entity of interest is based on the comparing.

At 706, the method 700 may include classifying, by the processor, the content based on the ML-NLP classifier, the ML-NLP classifier being pre-trained on a general corpus of data, further pre-trained a domain-specific corpus of data, and then fine-tuned on a topic-specific corpus of data labeled according to a plurality of topics of interest.

At 708, the method 700 may include determining, by the processor, based on the classified content, that the content relates to one or more of the plurality of topics. At 710, the method 700 may include causing, by the processor via a graphical user interface of a subscribing user that is subscribed to receive content relating to the entity of interest and the plurality of topics, the classifications to be transmitted to the subscribing user.

It should be understood that the methods 500-700 illustrated in FIGS. 5-7 may each include additional operations and that some of the operations described therein may be removed and/or modified without departing from the scopes of the methods 500-700. The description of the methods 500-700 may be made with reference to the features depicted other figures for purposes of illustration. Some or all of the operations set forth in each of the methods 500-700 may be performed by one or more of the components illustrated in FIGS. 1-4. As such, some or all of the operations set forth in each of the methods 500-700 may be included as circuitry, utilities, programs, or subprograms, in any desired computer accessible medium. In addition, each of the methods 500-700 may be embodied by computer programs, which may exist in a variety of forms. For example, some operations of each of the methods 500-700 may exist as computer-readable instructions, including source code, object code, executable code or other formats.

FIG. 8 illustrates an example of a graphical user interface (GUI) 141 of presenting content classified by the ML-NLP classifier. The GUI 141 may include an entity name input 802, a set of headlines 804A-N corresponding to respective content 111, and confidence associated with a respective classification of the respective content 111. FIG. 8 shows four headlines (804A-804N) and an example headline ("Listeria lawsuit filed against ABC Company") of the example content 111 illustrated in Table 1. Other numbers of headlines 804 and classifications may be provided as well.

The entity name input 802 may be configured to receive an identification of an entity of interest. As show, the entity of interest is "ABC Company." The GUI 141 may provide the entity of interest input to the computer system 110, such as via the interface 140 illustrated in FIG. 1. In response, the computer system 110 may access the classified content(s) 132 repository to access content 111 relevant to the entity of interest. Each content 111 may be provided via the GUI 141 along with its respective classification (including probability of such classification). It should be noted that if a given content 111 is classified into multiple classifications, then the GUI 141 may provide each classification.

As shown, content 111 corresponding to the headline "Listeria lawsuit filed against ABC Company" may be classified as a "Customer Health & Safety" topic with a 73% probability (or confidence) in such classification. Such probability may have exceeded a threshold confidence value (such as confidence threshold 410 illustrated in FIG. 4), resulting in an automatic classification. Other classifications may be been below a second threshold (such as the confidence threshold 420 illustrated in FIG. 4), resulting in a "None" classification. It should be noted that the confidence may be expressed as a decimal and/or other probabilistic value.

FIG. 9 illustrates an example of a GUI 143 of receiving feedback regarding a classification by the ML-NLP classifier. In some examples, the GUI 143 may result from receiving a selection (such as a click or other selection) of a headline 804. As shown, the GUI 143 may provide the headline, classification, confidence, and/or other information for the corresponding content 111. Natural language text 806 from may be provided for review as well. The GUI 143 may include a feedback input 810 configured to receive feedback from a user. For example, the feedback input 810 may prompt the user to reclassify the content 111 into another classification and/or provide an indication that the classification is incorrect. In either instance, the feedback may be stored in the topic-specific corpus 105 as labeled data for subsequent training on positive labels (where the input indicated that the content 111 should be classified into one or more classifications) and/or negative labels (where the input indicated that the content should not be classified into one or more classifications).

For simplicity and illustrative purposes, the disclosure included descriptions that may refer to examples. In the description, numerous specific details have been set forth in order to provide a thorough understanding of the present disclosure. It will be readily apparent however, that the disclosure may be practiced without limitation to these specific details. In other instances, some methods and structures have not been described in detail so as not to unnecessarily obscure the present disclosure.

Throughout the disclosure, the terms "a" and "an" may be intended to denote at least one of a particular element. As used herein, the term "includes" means includes but not limited to, the term "including" means including but not limited to. The term "based on" means based at least in part on.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure. What has been described and illustrated herein is an example of the disclosure along with some of its variations. The terms, descriptions and figures used herein are set forth by way of illustration only and are not meant as limitations. As such, the disclosure is intended to be defined by the following claims—and their equivalents—in which all terms are meant in their broadest reasonable sense unless otherwise indicated.

What is claimed is:

1. A computer system to classify content based on a machine-learning natural language processing (ML-NLP) classifier, the computer system comprising:
   a processor programmed to:
      receive content comprising natural language text;
      access an identification of a plurality of topics of interest, which are received from a user, that are associated with a domain;
      provide an input based on the content to the ML-NLP classifier, the ML-NLP classifier being based on a base model having a plurality of layers that is pre-trained on a general corpus of data, and then further pre-trained a domain-specific corpus of data specific to the domain, wherein at least one output layer for performing a classification task that predicts whether the content relates to one of the plurality of topics of interest is appended to the base model, wherein the base model with the at least one appended output layer is further trained on a topic-specific corpus of data labeled according to the plurality of topics of interest, wherein the general corpus of data, the domain-specific corpus of data, and the topic-specific corpus of data are independent of one another;
      generate, as an output of the ML-NLP classifier using the at least one output layer for performing the classification task, a prediction that the content relates to a corresponding topic from among the plurality of topics of interest; and
      generate a report based on the one or more classifications.

2. The system of claim 1, wherein the processor is further programmed to:
   determine that the content is related to at least a first topic of interest and a second topic of interest.

3. The system of claim 1, wherein the processor is further programmed to:
   reclassify the content into one or more of a second plurality of topics of interest.

4. The system of claim 1, wherein the ML-NLP classifier comprises a bidirectional encoder representations from transformers model, the domain-specific corpus of data relates to a financial domain, and the topic-specific corpus relates to environmental, social, or governance.

5. The system of claim 1, wherein the domain-specific corpus of data is in a first language, and where the processor is further programmed to:
   translate, based on a machine translation, the domain-specific corpus of data from the first language to a second language;
   translate, via the machine translation, the domain-specific corpus of data from the second language back to the first language to generate a second version of the domain-specific corpus of data, wherein the second version of the domain-specific corpus of data is different than the domain-specific corpus of data; and
   expand the domain-specific corpus of data based on the second version of the domain-specific corpus of data.

6. The system of claim 1, wherein the processor is further programmed to:
   receive an identification of one or more new topics of interest;
   update the plurality of topics of interest based on the one or more new topics of interest; and
   retrain the ML-NLP classifier based on the updated plurality of topics.

7. The system of claim 1, wherein the processor is further programmed to:
   access a relevance score that indicates a level of relevance of the content to an entity of interest; and
   weight the respective probabilities based on the relevance score.

8. The system of claim 1, wherein the processor is further programmed to:
   receive, via a graphical user interface, an identification of at least a first topic;
   identify, one or more content that was classified into the first topic; and
   provide data based on the identified one or more content.

9. The system of claim 1, wherein the processor is further programmed to:
   receive, from a manual curator, feedback comprising an indication of whether or not the content was correctly identified as being related to a particular topic of interest from among the plurality of topics of interest; and
   add the content to the topic-specific corpus as labeled training data based on the indication.

10. The system of claim 1, wherein the processor is further programmed to:
    for each of the one or more classifications of the content:
       compare the respective probability that the content relates to the corresponding topic with a confidence threshold, and determine whether the content relates to the corresponding topic based on the comparison; and
    populate the report based on the determinations.

11. The system of claim 10, wherein to determine whether the content relates to the corresponding topic based on the comparison, the processor is further programmed to:

determine that the respective probability meets or exceeds a first confidence threshold; and automatically classify the content as relating to the corresponding topic based on the determination that the content meets or exceeds the first confidence threshold.

12. The system of claim 10, wherein to determine whether the content relates to the corresponding topic based on the comparison, the processor is further programmed to:

determine that the respective probability does not meet or exceed a first confidence threshold but meets or exceeds a second confidence threshold lower than the first confidence threshold; and flag the content to be verified as relating to the corresponding topic based on the determination that the respective probability does not meet or exceed the first confidence threshold but meets or exceeds the second confidence threshold.

13. The system of claim 10, wherein the content relates to an entity, and wherein the processor is further programmed to:

receive a request for contents relating to the entity and the plurality of topics of interest;

determine that the content relates to the entity, wherein the report is generated responsive to the request; and transmit the report to a user.

14. The system of claim 10, wherein to determine whether the content relates to the corresponding topic based on the comparison, the processor is further programmed to:

determine that the respective probability does not meet or exceed a first confidence threshold and does not meet or exceed a second confidence threshold lower than the first confidence threshold; and determine that the content does not relate to the corresponding topic based on the determination that the respective probability does not meet or exceed the first confidence threshold and does not meet exceed the second confidence threshold.

15. The system of claim 14, wherein the processor is further programmed to:

determine that none of the respective probabilities meet or exceed the second confidence threshold; and remove the content from being considered for a pool of content determined to be relevant to the plurality of topics of interest.

16. A non-transitory computer-readable medium that stores instructions to classify content based on a machine-learning natural language processing (ML-NLP) classifier, the instructions, when executed by a processor, program the processor to:

access a general corpus of data comprising text;

train the ML-NLP classifier based on a base model having a plurality of layers that is pre-trained on the general corpus of data;

access a domain-specific corpus of data comprising text relating to a specific domain;

further train the ML-NLP classifier based on the domain-specific corpus of data;

access a topic-specific corpus of data labeled according to a plurality of topics of interest, wherein at least one output layer for performing a classification task that predicts whether the content relates to one of the plurality of topics of interest is appended to the base model, wherein the general corpus of data, the domain-specific corpus of data, and the topic-specific corpus of data are independent of one another;

further train the ML-NLP classifier having the base model and the appended at last one output layer based on the topic-specific corpus of data; and provide a classification service based on the trained ML-NLP classifier, wherein the classification service generates a respective classification of whether or not content relates to one or more of a plurality of topics of interest associated with a domain.

17. The non-transitory computer-readable medium of claim 16, wherein the instructions, when executed by the processor, further program the processor to:

expand the topic-specific corpus of data to increase an amount of training data from the topic-specific corpus of data.

18. The non-transitory computer-readable medium of claim 16, wherein the instructions, when executed by the processor, further program the processor to:

access labeled mapping data that includes a mapping between the plurality of topics of interest and a second plurality of topics interest; and map the plurality of topics of interest to the second plurality of topics of interest, wherein the content is classified according to the second plurality of topics of interest based on the mapped plurality of topics of interest.

19. A method of classifying content based on a machine-learning natural language processing (ML-NLP) classifier, the method comprising:

receiving, by a processor, content;

determining, by the processor, that the content relates to an entity of interest;

classifying, by the processor, the content based on the ML-NLP classifier, the ML-NLP classifier being based on a base model having a plurality of layers that is pre-trained on a general corpus of data, further pre-trained a domain-specific corpus of data, wherein at least one output layer for performing a classification task that predicts whether the content relates to one of a plurality of topics of interest is appended to the base model, wherein the plurality of topics of interested is provided by a subscribing user and wherein base model with the at least one appended output layer is further trained on a topic-specific corpus of data labeled according to a plurality of topics of interest, wherein the general corpus of data, the domain-specific corpus of data, and the topic-specific corpus of data are independent of one another;

determining, by the processor, based on the classified content, that the content relates to one or more of the plurality of topics; and causing, by the processor via a graphical user interface of the subscribing user that is subscribed to receive content relating to the entity of interest and the plurality of topics, the classifications to be transmitted to the subscribing user.

20. The method of claim 19, wherein determining that the content relates to the entity of interest comprises:

performing named entity recognition on the content to identify one or more entities referred to in the content; and comparing the one or more entities to a listing of entities of interest, wherein the determination that the content relates to the entity of interest is based on the comparing.

* * * * *